Sept. 4, 1951     W. F. THOMPSON     2,566,683
SCREW-HOLDING SCREW DRIVER
Filed Dec. 13, 1946
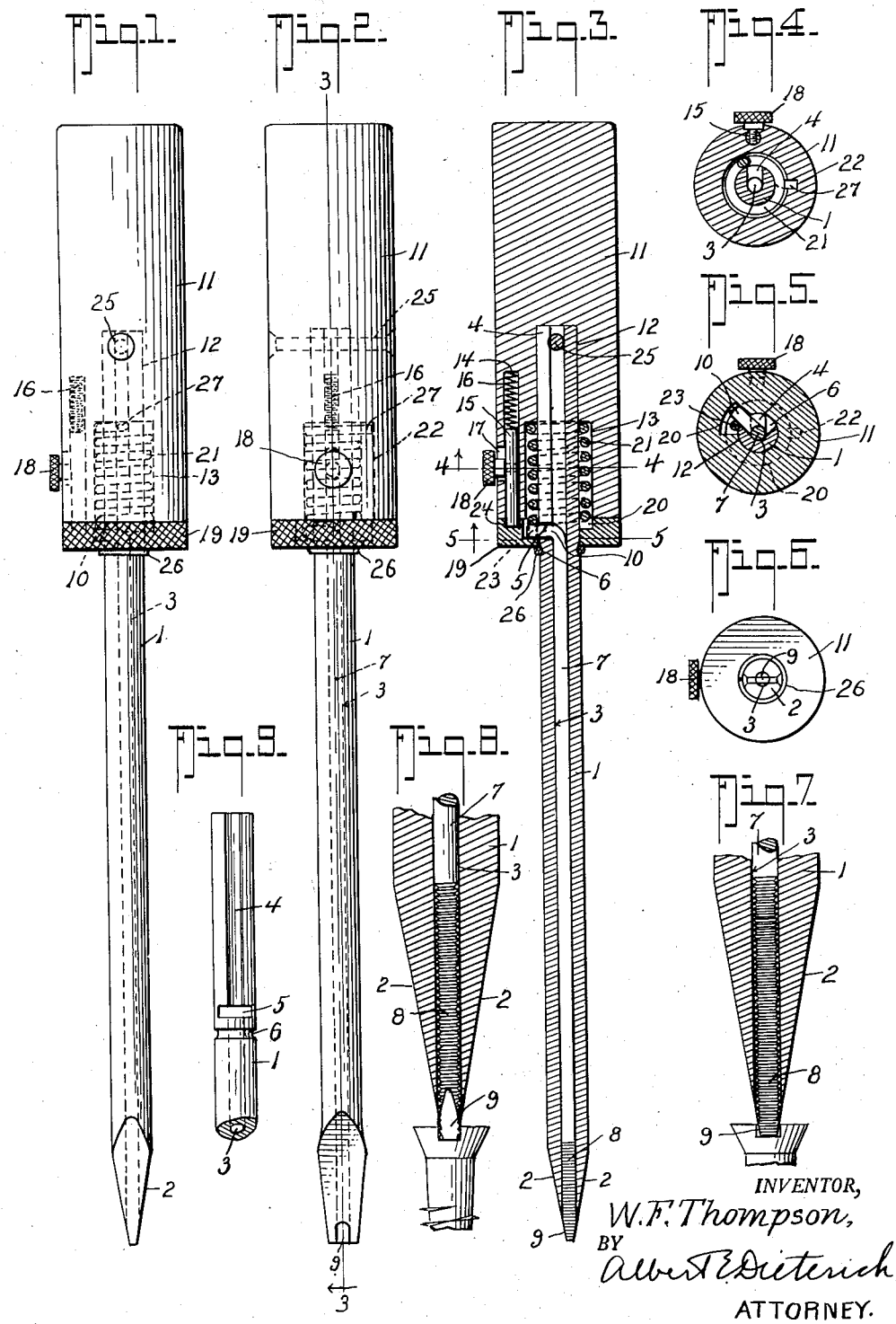
INVENTOR,
W. F. Thompson,
BY
Albert E. Dieterich,
ATTORNEY.

Patented Sept. 4, 1951

2,566,683

UNITED STATES PATENT OFFICE 2,566,683

SCREW-HOLDING SCREW DRIVER

William F. Thompson, Salina, Kans.

Application December 13, 1946, Serial No. 715,970

1 Claim. (Cl. 145—50)

The present invention relates to screw drivers having means for holding the screw to the blade of the screw driver while starting a screw. Screw drivers of this class may be roughly divided into two groups, those which hold the screw to the screw driver by jaw-like means which grip the head of the screw, and those which operate solely within the kerf of the screw. It is to this latter group that my invention specifically relates.

It has heretofore been proposed to drill the shank of a screw driver and mount therein a rod having a flat end adjacent the edge of the shank blade which rod when turned will tend to jam in the kerf and thereby hold the screw in place. All such screw drivers heretofore known to me are not wholly reliable. The screw frequently falls off.

My invention has for its principal object to overcome this defect in previous screw drivers and provide a positively-operative holding means.

A further object is to improve the general construction of the screw driver.

Again it is the object of the present invention to provide a screw driver of the kind above referred to that can be re-ground, re-shaped, etc., when worn, damaged or broken, i. e., can be ground back to its original shape without loss of toothed gripping edges on the inner rod.

With the above objects in view invention further resides in the novel details of construction, combination and arrangement of parts all of which will first be described in detail and then be specifically pointed out in the appended claim, reference being had to the accompanying drawing in which:

Figs. 1 and 2 are elevations 90 degrees apart, showing my improved screw driver.

Fig. 3 is a longitudinal section of the same on the line 3—3 of Fig. 2.

Fig. 4 is a cross section on the line 4—4 of Fig. 3.

Fig. 5 is a cross section on the line 5—5 of Fig. 3.

Fig. 6 is a bottom end elevation of the screw driver.

Fig. 7 is an enlarged detail longitudinal gripping rod in its inactive position.

Fig. 8 is a view like Fig. 7 with the gripping rod in its active position.

Fig. 9 is a detail elevation of the handle end of the shank.

In the drawing in which like numerals of reference indicate like parts in all the figures, I represents the shank of the screw driver, one end of which (the blade) is bevelled or tapered as at 2. The shank is drilled longitudinally to provide a bore 3 extending from one end to the other. That portion of the shank which is secured in the bore 12 of the handle 11 is also slotted lengthwise, as at 4, and is provided with a 90° cross slot 5, and an annular groove 6.

7 represents a length of hardened wire rod which freely fits the bore 3 from the blade end of the shank to the groove 5 at which place it is bent at right angles as at 10 to lie in the recess 20 of a knurled ring 19 that turns on the shank 1. The rod 7 is threaded or knurled for a greater or lesser distance from its outer end as at 8 and it has two bevelled faces 9 that line up with the bevelled faces 2 when the rod is in its inactive position (Fig. 7). The diameter of the rod 7 is slightly greater than the screw contacting edge of the blade of the shank so that when the rod is in action the flat surfaces 9 will lie crosswise of the kerf as shown in Fig. 8.

The handle 11, in addition to the bore 12, has a counterbore 13 and a slot 22 to receive the torsion spring 21, one end 23 of which lies against member 10 and the other end 27 of which lies in the slot 22. The spring 21 is for the purpose of holding rod member 10 seated in the slot 20 and to turn the rod into its active position.

The handle 11 is also bored as at 14 to receive a latch bolt 15 and spring 16. A finger button screw 18 has a portion that passes through a slot 17 in the handle and screws into the bolt 15 for operating same. The knurled ring 19 has a suitably located notch 24 to receive the outer end of the latch bolt 15 to hold the ring 19 in a position to hold rod 7 in its inactive position as shown in Fig. 3.

The shank may be secured in the handle 11 in any approved way as by a rivet 25 and a split ring 26 is placed in groove 6 to hold ring 19 in place.

After placing a screw on the blade of the screw driver as shown in Fig. 7, button 18 is moved to release latch bolt 15 from notch 24 whereupon spring 21 will turn rod 7 to the active or screw-holding position (Fig. 8). The diameter of the rod 7, being slightly greater than the width of the slot in the screw used results, when rod is turned within the slot, and sufficient pressure applied (as by torsion spring 21) to such rotation, in a positive locking or holding of the screw upon the blade of the screw driver. The points of the threads or milling on the rod bite into the side walls of the kerf of the screw and thereby prevent accidental disconnection of the screw from the blade of the screw driver. Thus the holding of the screw upon the blade does not depend on the contact of a smooth corner edge of the rod as in previously known screw drivers of this general type, but the screw is firmly held on my tool by the action of the saw-tooth edges under the action of spring 21. The degree of pressure applied by the spring tension rotating rod 7 governs the amount of "bite" applied to hold the screw.

The rod 7 may be knurled or threaded throughout its length if desired but only a portion equal to the length of the blade of the screw driver is sufficient for all practical purposes.

In manufacturing my tool, it would appear best that the blade, before shaping or grinding to form, should have the rod inserted therein and latched into position and both blade and rod ground and finished while such fixed relation to one another remains. This being done, it is clear that in such fixed position (normal or inactive position) the rod and blade are in form quite similar to the standard shaped screw driver blade.

The slotting of the shank at 4 permits bending over the end 10 of the rod 7 before assembling the rod and shank.

To release the screw it is only necessary to turn ring 19 backward (counter-clockwise in Fig. 5) until latch bolt 15 again enters recess 24.

From the foregoing description taken in connection with the accompanying drawing it is thought that the construction, operation and advantages will be clear to those skilled in the art.

What I claim is:

In a screw driver, a handle having a central shank-receiving bore and a counter-bore, a tubular shank held with one end in said central bore said end being longitudinally slotted and provided with a cross slot merging with the longitudinal slot, a screw-gripping rod swivelly mounted in said tubular shank and having a right-angularly extended end located in said cross slot, a torsion spring in said counter-bore with one of its ends anchored to said handle and the other end engaging the end of said rod which lies in said cross slot and continuously tending to turn said rod in one directtion, a member rotatably mounted on said shank adjacent said handle and operatively connected to said rod for turning the rod against spring tension, and a latch device mounted on the handle and operatively engaging said rotatable member to hold it against turning under the spring action, the free end of said tubular shank and that of said rod being tapered to enter the kerf of a screw when said tapered portions of shank and rod are in alignment, said tapered end of the rod having means to grip the screw in its kerf when said rod is turned to disalign said tapered ends of the shank and rod, and means to hold said shank from turning in said handle.

WILLIAM F. THOMPSON.

REFERENCES CITED

The following references are of record in the file of this patent:

UNITED STATES PATENTS

| Number | Name | Date |
|---|---|---|
| 1,063,304 | Titus | June 13, 1913 |
| 1,499,491 | Weissbeck et al. | July 1, 1924 |
| 1,536,758 | Bodmer | May 5, 1925 |
| 1,781,470 | Mueller | Nov. 11, 1930 |
| 2,161,095 | Schaffer | June 6, 1939 |
| 2,404,427 | Bloomfield | July 23, 1946 |

FOREIGN PATENTS

| Number | Country | Date |
|---|---|---|
| 224,028 | Great Britain | Nov. 6, 1924 |